US009829360B2

United States Patent
Sudou et al.

(10) Patent No.: US 9,829,360 B2
(45) Date of Patent: Nov. 28, 2017

(54) AIR FLOW SENSOR INCLUDING A RESIN-MOLDED PROTECTION MEMBER FOR A TEMPERATURE SENSOR

(71) Applicant: DENSO CORPORATION, Kariya, Aichi-pref. (JP)

(72) Inventors: Akiyuki Sudou, Takahama (JP); Keisuke Itakura, Hekinan (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 14/696,694

(22) Filed: Apr. 27, 2015

(65) Prior Publication Data
US 2015/0308872 A1  Oct. 29, 2015

(30) Foreign Application Priority Data

Apr. 28, 2014  (JP) .................................. 2014-92307

(51) Int. Cl.
| | |
|---|---|
| *G01F 1/68* | (2006.01) |
| *G01F 1/684* | (2006.01) |
| *G01F 15/02* | (2006.01) |
| *G01F 15/14* | (2006.01) |

(52) U.S. Cl.
CPC ............ *G01F 1/6842* (2013.01); *G01F 15/02* (2013.01); *G01F 15/14* (2013.01)

(58) Field of Classification Search
None
See application file for complete search history.

(56) References Cited

U.S. PATENT DOCUMENTS

| | | | | | |
|---|---|---|---|---|---|
| 5,693,879 | A | * | 12/1997 | Rilling | .................... G01F 1/684 73/204.22 |
| 5,780,735 | A | * | 7/1998 | Kadohiro | .................. G01F 1/68 73/202.5 |
| 5,847,275 | A | * | 12/1998 | Kondo | ............. F02M 35/10013 73/202.5 |

(Continued)

FOREIGN PATENT DOCUMENTS

| | | |
|---|---|---|
| JP | 3242286 | 10/2001 |
| JP | 2010-185793 | 8/2010 |
| JP | 2013-217709 | 10/2013 |

OTHER PUBLICATIONS

Sudou, U.S. Appl. No. 14/696,699, filed Apr. 27, 2015.
Sudou, U.S. Appl. No. 14/696,705, filed Apr. 27, 2015.

*Primary Examiner* — Harshad R Patel
(74) *Attorney, Agent, or Firm* — Nixon & Vanderhye P.C.

(57) ABSTRACT

An air flow measuring device includes a housing, a sensing part, a temperature sensor, a supporting member, and a protective projection. The housing defines a bypass flow passage which guides a part of air flowing in a duct. The sensing part is disposed in the bypass flow passage to measure a flow rate of air in the bypass flow passage. The sensor detects temperature of air flowing in the duct outside the housing. The supporting member supports the sensor at a predetermined measurement position. The protective projection is a projection, which projects outward from a side surface of the housing and is formed by mold removal in one direction. An end of the protective projection is located outward of the sensor. The protective projection makes contact with an object approaching the sensor from outside the housing to limit contact of the object with the sensor.

5 Claims, 4 Drawing Sheets

(56) References Cited

U.S. PATENT DOCUMENTS

| | | | |
|---|---|---|---|
| 6,336,361 B1* | 1/2002 | Uramachi | G01F 1/6842 |
| | | | 73/204.22 |
| 2011/0088464 A1 | 4/2011 | Ariyoshi et al. | |
| 2012/0325011 A1 | 12/2012 | Takiguchi et al. | |
| 2013/0036806 A1* | 2/2013 | Kohno | G01F 1/684 |
| | | | 73/114.33 |

* cited by examiner

AIR FLOW SENSOR INCLUDING A RESIN-MOLDED PROTECTION MEMBER FOR A TEMPERATURE SENSOR

CROSS REFERENCE TO RELATED APPLICATION

This application is based on Japanese Patent Application No. 2014-92307 filed on Apr. 28, 2014, the disclosure of which is incorporated herein by reference.

TECHNICAL FIELD

The present disclosure relates to an air flow measuring device including a temperature sensor that measures temperature of air in a duct.

BACKGROUND

Conventionally, as a flow measuring device, there is a device including a housing having a bypass flow passage that guides a part of air (mainstream) flowing in a duct, a temperature sensor for measuring temperature of the air flowing in the duct outside the housing, and a protection cover that is provided integrally with the housing to protect the temperature sensor (see, e.g., JP2010-185793A).

The air flow measuring device is inserted into the duct through an attachment hole formed at the duct so as to be disposed in the duct. When a side facing an opening edge of the attachment hole at the time of the insertion of the device is referred to as a front side of the temperature sensor, and an insertion direction side is referred to as a lower side of the temperature sensor, a protection member has an L-shape in section surrounding the front side and the lower side of the temperature sensor. The protection cover having such a shape prevents contact of the temperature sensor with the duct at the time of the insertion of the device into the attachment hole, and also serves as a protection member that protects the temperature sensor from objects approaching the temperature sensor such as fingers and other members.

However, the protection cover in an L-shape in section has a complicated mold structure at the time of resin-molding. In Japanese Patent No. 3242286, there is described an art whereby a protection wall projecting from a side surface of the housing is provided on a lower side of the temperature sensor to prevent the contact of the temperature sensor with the duct at the time of the insertion into the attachment hole. Nevertheless, this protection wall has an insufficient protective function because its end is located inward of the temperature sensor.

SUMMARY

The present disclosure addresses at least one of the above issues. Thus, it is an objective of the present disclosure to configure a protection member for a temperature sensor such that resin-molding by a simple mold structure can be performed in a flow measuring device including the temperature sensor.

To achieve the objective of the present disclosure, there is provided an air flow measuring device adapted to be attached to a duct. The air flow measuring device includes a housing, a sensing part, a temperature sensor, a supporting member, and a protective projection. The housing defines a bypass flow passage which takes in a part of air flowing in the duct. The sensing part is disposed in the bypass flow passage to measure a flow rate of air in the bypass flow passage. The temperature sensor detects temperature of air flowing in the duct outside the housing. The supporting member supports the temperature sensor at a predetermined measurement position. The protective projection is a projection, which projects outward from a side surface of the housing and is formed by mold removal in one direction. An end of the protective projection is located outward of the temperature sensor. The protective projection makes contact with an object approaching the temperature sensor from outside the housing to limit contact of the object with the temperature sensor.

Accordingly, the temperature sensor can be protected by a structure that enables resin-molding in a simple mold structure of the "projection that is formed by mold removal in one direction".

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
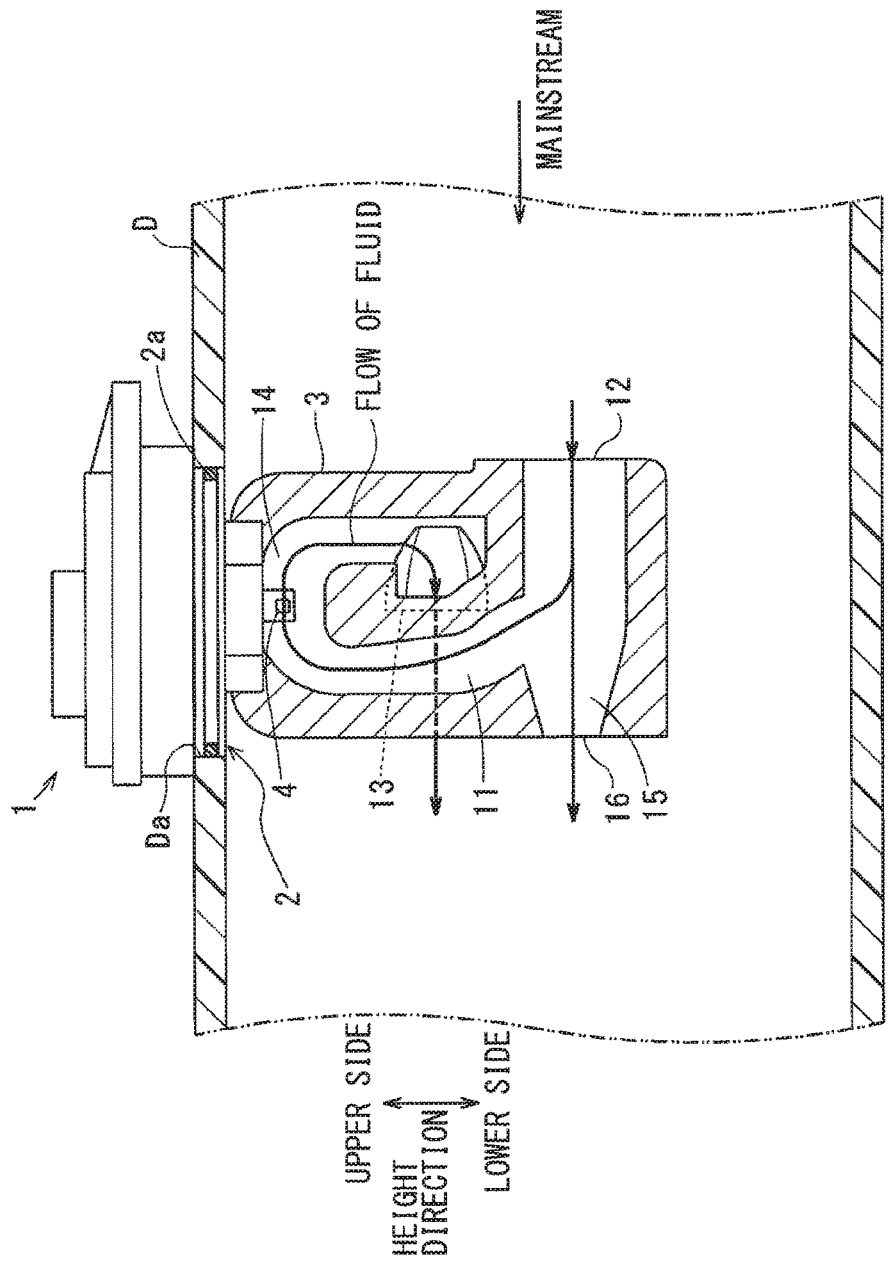
FIG. 1 is a schematic sectional view illustrating an air flow measuring device in accordance with an embodiment.
Figure 2:
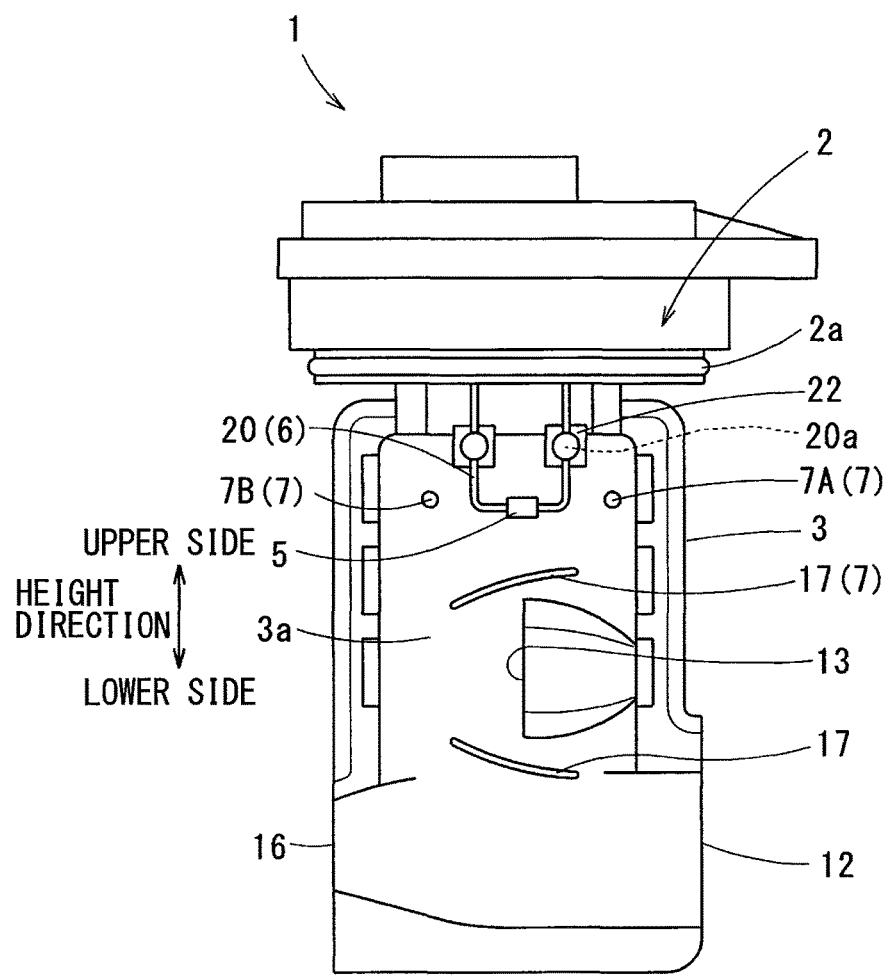
FIG. 2 is a side view illustrating the air flow measuring device of the embodiment.

An embodiment will be explained in detail in the following description.

A configuration of an air flow measuring device 1 of the embodiment will be described with reference to FIGS. 1 to 4B. The air flow measuring device 1 is, for example, an air flow meter that measures an amount of intake air to an engine for an automobile, and is used by attachment to a duct D defining an intake passage to the engine for the automobile. An attachment hole Da having a round shape opens on a pipe wall of the duct D, and the air flow measuring device 1 is inserted and thereby disposed in the duct D through the attachment hole Da.

The air flow measuring device 1 is configured integrally by, for example, a base portion 2, a housing 3, a flow sensor (sensing part) 4, a temperature sensor 5, a supporting member 6, a protective projection 7, which will be explained in the following description.

The base portion 2 is fitted in the attachment hole Da, and includes an outer peripheral surface opposed to an inner peripheral surface of the attachment hole Da. A circumferential groove is formed on this outer peripheral surface, and a clearance between the inner peripheral surface of the attachment hole Da and the outer peripheral surface of the base portion 2 is sealed with an O-ring 2a disposed in the circumferential groove (see FIG. 1).

The housing 3 extends from the base portion 2 into the duct D to be disposed in the duct D, and defines a bypass flow passage 11 that guides a part (measurement air) of intake air flowing in the duct D. In the following description, a direction of a flow (mainstream) of air flowing in the duct D is referred to as a mainstream direction. Furthermore, a direction in which the housing 3 extends from the base portion 2 is referred to as a lower side in a height direction, and an opposite side of this is referred to as an upper side in the height direction. In addition, a wall surface of the housing 3 that is along the mainstream direction and extends in the height direction is referred to as a housing side surface 3a. In the present embodiment, the height direction and the mainstream direction are perpendicular to each other. The housing 3 is formed by injection-molding.

The bypass flow passage 11 will be described below. The bypass flow passage 11 includes an inlet port 12 that opens toward an upstream side in the flow (mainstream) of air flowing in the duct D, and a discharge port 13 for intake air that opens toward a downstream side in the mainstream. For example, the bypass flow passage 11 guides the intake air around from the inlet port 12 toward the discharge port 13 (see FIG. 1). The bypass flow passage 11 includes a region 14 where the fluid flows reversely to a forward direction in the mainstream direction, and the flow sensor 4 is disposed in this region 14.

A dust discharge passage 15 for discharging dust is connected to the bypass flow passage 11 on an upstream side of the flow sensor 4. The dust which has entered into the bypass flow passage 11 returns into the duct D through a dust discharge port 16 via the dust discharge passage 15 without flowing toward the flow sensor 4.

The discharge port 13 is formed to open on a housing side surface on a downstream side in the mainstream. The fluid released from the discharge port 13 flows along the housing side surface 3a (see FIG. 2). The bypass flow passage 11 branches into two passages on a downstream side of the flow sensor 4, and the discharge ports 13 are provided respectively on both side surfaces of the housing 3.

On the housing side surface 3a, there is provided a flow straightening plate 17 for straightening the fluid discharged from the discharge port 13 and the fluid flowing around the discharge port 13.

The flow sensor 4 outputs an electrical signal (e.g., voltage signal) according to a flow rate of air flowing through the bypass flow passage 11. Specifically, the flow sensor 4 includes a heater element and a thermosensitive element formed by a thin film resistor on a membrane provided for a semiconductor substrate, and these elements are connected to a circuit board (not shown) accommodated in the base portion 2.

The temperature sensor 5 is a temperature detecting element (bobbin type resistor) that detects the temperature of air flowing in the duct D. A lead wire 20 extends from both ends of the temperature sensor 5, and the lead wire 20 is connected to the circuit board (not shown) accommodated in the base portion 2. The temperature sensor 5 is supported by the supporting member 6 at a predetermined measurement position that is spaced away in a direction perpendicular to the housing side surface 3a outside the housing side surface 3a.

The supporting member 6 is electrically connected to the circuit board of the base portion 2. The supporting member 6 extends from the base portion 2 in a direction (lower side) in which the housing 3 extends, and holds the temperature sensor 5 at its end portions. In the present embodiment, the lead wire 20 serves as the supporting member 6, and supports the temperature sensor 5 at the predetermined measurement position. Specifically, the lead wire 20 projects from both the ends of the temperature sensor 5 to be bent toward the upper side along the way, and its end portions are connected to the circuit board. As a result, the lead wire 20 extends toward the lower side from the base portion 2 to serve as the supporting member 6 that holds the temperature sensor 5 at its end portions (lower end portions). In addition, the supporting member 6 may include a terminal extending from the base portion 2 toward the lower side, and the lead wire 20 connected to the terminal (see JP2010-185793A).

A fixing part 20a that is crimped and fixed to a supporting projection 22 projecting from the housing side surface 3a is provided for the part of the lead wire 20 that extends from the base portion 2 toward the lower side. Characteristics of the embodiment will be described below. The air flow measuring device 1 includes the protective projection 7 which will be explained in the following description. The protective projection 7 is a projection that projects outward from the housing side surface 3a, and is formed by injection-molding at the time of forming of the housing 3. The protective projection 7 has a shape that can be formed by mold removal in one direction. Therefore, the projection 7 is formed in a shape without having a flange, hook shape or the like. The leading end of the protective projection 7 is located outward of the temperature sensor 5. The protective projection 7 makes contact with an object approaching the temperature sensor 5 from the outside of the housing 3 to prevent the object from coming into contact with the temperature sensor 5.

Figure 3:
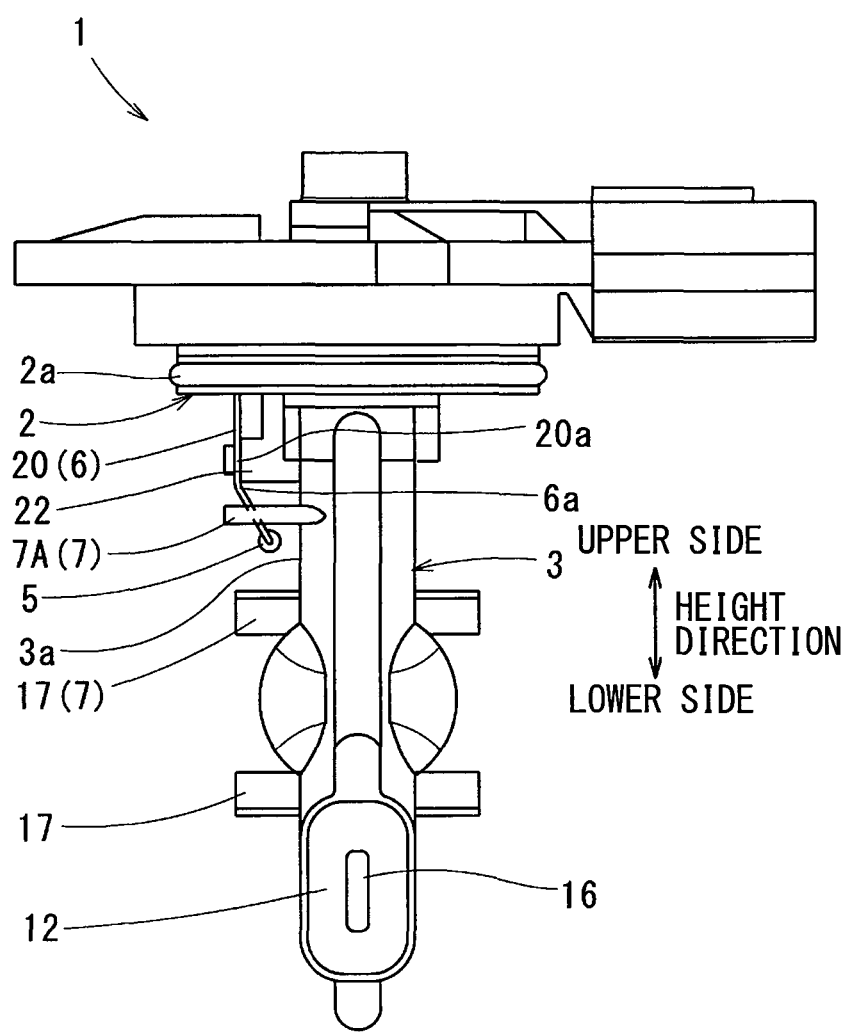
FIG. 3 is a plan view illustrating the air flow measuring device viewed from an upstream side in a mainstream direction according to the embodiment.
Figure 4A:
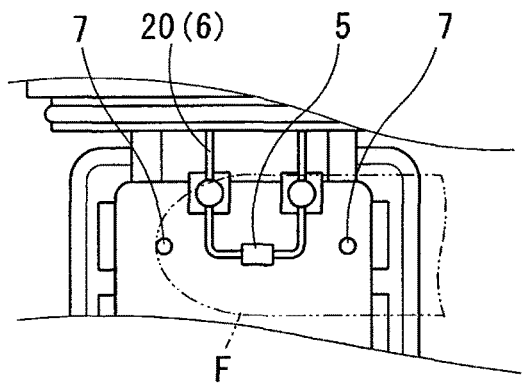
FIG. 4A is a diagram illustrating operation of the air flow measuring device of the embodiment.
Figure 4B:
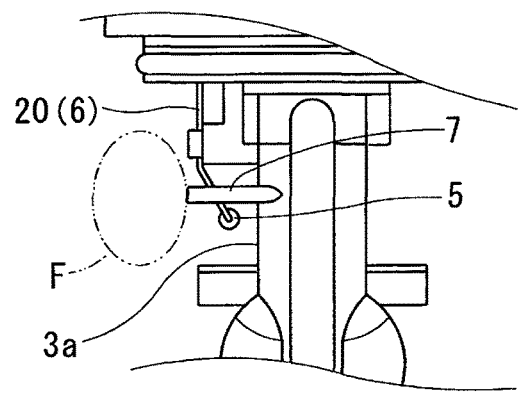
FIG. 4B is a diagram illustrating FIG. 4A viewed from the upstream side in the mainstream direction according to the embodiment.

In the present embodiment, the protective projection 7 is a projection projecting in a direction perpendicular to the housing side surface 3a, and its end position is located outward of the temperature sensor 5 (on a side away from the housing side surface 3a) (see FIG. 3).

There are provided more than one protective projection 7, and the protective projections 7 are arranged to surround the temperature sensor 5. The protective projection 7 is disposed at a position that does not interfere with the lead wire 20 (supporting member 6).

In the present embodiment, one rod-shaped protective projection 7 is provided respectively on an upstream side of the temperature sensor 5 in the mainstream direction and on a downstream side of the temperature sensor 5 in the mainstream direction. The protective projection 7 provided on an upstream side of the temperature sensor 5 in the mainstream direction is referred to as an upstream-side protective projection 7A. The protective projection 7 provided on a downstream side of the temperature sensor 5 in the mainstream direction is referred to as a downstream-side protective projection 7B. The projection lengths (sizes in a direction perpendicular to the housing side surface 3a) of the upstream-side protective projection 7A and the downstream-side protective projection 7B are the same. In addition, the flow straightening plate 17 which is positioned closer to the temperature sensor 5 also serves as the protective projection 7.

Accordingly, in the present embodiment, there are provided the three protective projections 7 of the upstream-side protective projection 7A, the downstream-side protective projection 7B, and the flow straightening plate 17. When viewed from the direction perpendicular to the housing side surface 3a, the temperature sensor 5 is located in a region surrounded with those protective projections 7 (see FIG. 2).

The upstream-side protective projection 7A and the temperature sensor 5 are provided at positions that do not overlap with each other when viewed from the mainstream direction. Specifically, the upstream-side protective projection 7A and the temperature sensor 5 differ in position in the height direction. A projection area that is formed by projecting the upstream-side protective projection 7A onto a projection plane perpendicular to the mainstream direction, and a projection area that is formed by projecting the temperature sensor 5 onto this projection plane do not overlap with each other. The upstream-side protective projection 7A and the downstream-side protective projection 7B are provided at the same positions in the height direction.

The supporting member 6 includes a bent part 6a that is inflected to bring the temperature sensor 5 closer to the housing side surface 3a. Specifically, a part of the supporting member 6 that projects from the base portion 2 and leads to the bent part 6a extends parallel to the housing side surface 3a. A part of the supporting member 6 that is on a lower side of the bent part 6a is inclined relative to the housing side surface 3a and extends to come closer to the housing side surface 3a further on a lower side. The fixing part 20a is provided on an upper side of the bent part 6a.

Effects of the embodiment will be described below. The air flow measuring device 1 of the present embodiment includes the protective projection 7 which is a projection that projects outward from the housing side surface 3a and is formed by mold removal in one direction. The end of the protective projection 7 is located outward of the temperature sensor 5, and the protective projection 7 makes contact with an object approaching the temperature sensor 5 from the outside of the housing 3 to prevent the object from coming into contact with the temperature sensor 5. Accordingly, the temperature sensor 5 can be protected by a structure that enables resin-molding in a simple mold structure of the "projection that is formed by mold removal in one direction". Application is possible also to formation of the housing 3 by a die slide injection molding (abbreviated as DSI) method, and a complex mold structure does not need to be added to form the protective projection 7.

The temperature sensor 5 is positioned outside the housing 3, and thus needs to be protected from the object (e.g., fingers, duct or other members) approaching the temperature sensor 5 from the outside of the housing 3. The end of this protective projection 7 is located outward of the temperature sensor 5. Accordingly, if, for example, a finger F approaches from the direction perpendicular to the housing side surface 3a, the finger F makes contact with the protective projection 7 and cannot come any closer to the housing side surface 3a (see FIGS. 4A and 4B). Thus, the protective projection 7 prevents the contact of the finger F with the temperature sensor 5. For this reason, the finger F can be prevented from coming into contact with the temperature sensor 5.

Particularly, by surrounding the temperature sensor 5 by more than one protective projection 7 as in the embodiment, a function of protecting the temperature sensor 5 can be improved. By making smaller a distance between the protective projections 7, contact of a smaller object with the temperature sensor 5 can be prevented.

The upstream-side protective projection 7A and the temperature sensor 5 are provided at positions that do not overlap with each other when viewed from the mainstream direction. Accordingly, the mainstream flows directly into the temperature sensor 5, and thus the temperature of air flowing inside the duct D can be measured with high accuracy.

The supporting member 6 includes a bent part 6a that is inflected to bring the temperature sensor 5 closer to the side surface 3a of the housing 3. Accordingly, the configuration of positioning the end of the protective projection 7 outward of the temperature sensor 5 is easily realized.

Modifications to the above-described embodiment will be explained below. In the embodiment, the flow straightening plate 17 serves also as the protective projection 7. However, the flow straightening plate 17 does not need to serve as the protective projection 7. In the embodiment, the two protective projections 7 (the upstream-side protective projection 7A, and the downstream-side protective projection 7B) are provided to position the temperature sensor 5 therebetween in the mainstream direction. Nevertheless, the arrangement of the protective projections 7 to surround the temperature sensor 5 is not limited to the aspect in the embodiment. For example, the temperature sensor 5 may be surrounded with three or more rod-shaped protective projections 7.

Figure 5:
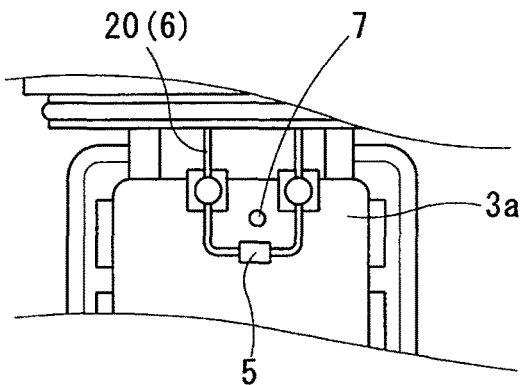
FIG. 5 is a partially enlarged view illustrating a side view of an air flow measuring device in accordance with a modification.

A single protective projection 7 may only be provided near the temperature sensor 5. For example, the present disclosure may include an aspect in which the single rod-shaped protective projection 7 is provided on the housing side surface 3a on an upper side of the position of the temperature sensor 5 as illustrated in FIG. 5. In this case as well, the function of protecting the temperature sensor 5 can be fulfilled. It is noted that surrounding the temperature sensor 5 by more than one protective projection 7 as in the embodiment has a higher protecting function.

The bypass flow passage 11 of embodiment is a flow passage that guides the intake air around from the inlet port 12 toward the discharge port 13, and includes the region 14 where the fluid flows reversely to the forward direction in the mainstream direction. However, the aspect for the bypass flow passage 11 is not limited to this. The present disclosure may include an aspect in which the bypass flow passage 11 is formed from the inlet port 12 along a forward flow in the mainstream direction such that the bypass flow passage 11 guides a part of the mainstream and does not make the air flow around, and the intake air entering from the inlet port 12 flows along the forward flow in the mainstream direction to be discharged.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device adapted to be attached to a duct, the air flow measuring device comprising:
   a housing that defines a bypass flow passage which is configured to guide a part of air flowing in the duct;
   a sensing part that is disposed in the bypass flow passage to measure a flow rate of air in the bypass flow passage;
   a temperature sensor that is configured to detect temperature of air flowing in the duct outside the housing;
   a supporting member that supports the temperature sensor at a predetermined measurement position; and
   a protective projection that projects only outward from a side surface of the housing and has a shape that allows removal of a mold used to form the protective projection with only one direction of movement of the mold, wherein:
   when viewed from a flow direction of air flowing in the duct, an end of the protective projection in a direction that the protective projection projects from the side surface of the housing is located outward of the temperature sensor; and the protective projection makes contact with an object approaching the temperature sensor from outside the housing to limit contact of the object with the temperature sensor.

2. The air flow measuring device according to claim 1, wherein the protective projection is one of a plurality of protective projections that are arranged to surround the temperature sensor.

3. The air flow measuring device according to claim 2, wherein:

the flow direction of air flowing in the duct is a mainstream direction; and the plurality of protective projections are provided on an upstream side of the temperature sensor in the mainstream direction and on a downstream side of the temperature sensor in the mainstream direction.

4. The air flow measuring device according to claim 1, wherein:

the flow direction of air flowing in the duct is a mainstream direction;

the protective projection which is provided on an upstream side of the temperature sensor in the mainstream direction is an upstream-side protective projection; and the upstream-side protective projection and the temperature sensor are provided at positions that do not overlap with each other when viewed from the mainstream direction.

5. The air flow measuring device according to claim 1, further comprising a base portion that is fitted in an attachment hole which opens on a wall surface of the duct to be attached to the duct, wherein:

the housing is disposed to extend from the base portion to inside of the duct;

the supporting member is disposed to extend from the base portion in a direction in which the housing extends, and holds the temperature sensor at an end portion of the supporting member; and the supporting member includes a bent part that is inflected to bring the temperature sensor closer to the side surface of the housing.

* * * * *